(12) United States Patent
Sharma

(10) Patent No.: US 11,102,212 B2
(45) Date of Patent: Aug. 24, 2021

(54) SYSTEMS AND METHODS FOR PERFORMING DATA PROTECTION OPERATIONS WITH A PROXY REGISTER

(71) Applicant: EMC IP Holding Company LLC, Hopkinton, MA (US)

(72) Inventor: Anupam Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 6 days.

(21) Appl. No.: 16/825,205

(22) Filed: Mar. 20, 2020

(65) Prior Publication Data

US 2021/0160243 A1   May 27, 2021

Related U.S. Application Data

(63) Continuation of application No. 15/722,748, filed on Oct. 2, 2017, now Pat. No. 10,601,837.

(51) Int. Cl.
| | |
|---|---|
| *G06F 21/62* | (2013.01) |
| *H04L 29/06* | (2006.01) |
| *G06F 21/60* | (2013.01) |
| *G06F 11/14* | (2006.01) |
| *G06F 9/455* | (2018.01) |
| *G06F 3/06* | (2006.01) |

(52) U.S. Cl.
CPC ........ *H04L 63/102* (2013.01); *G06F 11/1464* (2013.01); *G06F 21/604* (2013.01); *G06F 21/62* (2013.01); *G06F 3/065* (2013.01); *G06F 3/067* (2013.01); *G06F 9/45558* (2013.01)

(58) Field of Classification Search
CPC .... H04L 63/102; G06F 21/62; G06F 11/1464; G06F 21/604; G06F 3/067; G06F 3/065; G06F 9/45558
See application file for complete search history.

(56) References Cited

U.S. PATENT DOCUMENTS

| | | | |
|---|---|---|---|
| 8,819,369 B1 * | 8/2014 | Alappat | G06F 9/45558 711/162 |
| 9,633,011 B1 * | 4/2017 | Wencel | G06Q 10/10 |
| 2012/0278287 A1 * | 11/2012 | Wilk | G06F 11/1464 707/654 |
| 2014/0201157 A1 * | 7/2014 | Pawar | G06F 16/21 707/654 |
| 2015/0154040 A1 * | 6/2015 | Inada | G06F 11/1464 718/1 |
| 2015/0234713 A1 * | 8/2015 | Shimada | G06F 11/1469 714/19 |

* cited by examiner

*Primary Examiner* — Meng Li
(74) *Attorney, Agent, or Firm* — Workman Nydegger

(57) ABSTRACT

Embodiments of the invention eliminate problems associated with annotation dependency when providing data protection operations. A proxy register is provided such that proxies can register with the data protection servers. The proxies identified in the proxy register, for each server, are uniquely identified in the proxy register and the proxy register ensures that proxies participating in the performance of data protection operations are excluded from being protected while unregistered proxies can be protected by the data protection application.

20 Claims, 3 Drawing Sheets

SYSTEMS AND METHODS FOR PERFORMING DATA PROTECTION OPERATIONS WITH A PROXY REGISTER

FIELD OF THE INVENTION

Embodiments of the present invention relate to systems and methods for performing data protection operations including backup operations and/or restore operations. More particularly, embodiments of the invention control how and when proxies are included or part of data protection operations.

BACKGROUND

Computing systems today include a variety of different configurations. Many computing systems, for example, make use of virtual machines to some degree. When performing a data protection operation, data protection applications do not allow its proxies to be part of the protection.

To disable the proxies from being selected, annotations have been used because annotations can be edited and morphed. By changing the annotations, a virtual machine (e.g., a proxy) can become a different virtual machine. However, changing the annotation of a virtual machine, however, may have an adverse impact on the protection operations. Systems and methods are needed to ensure that data protection operations are performed correctly and reliably.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
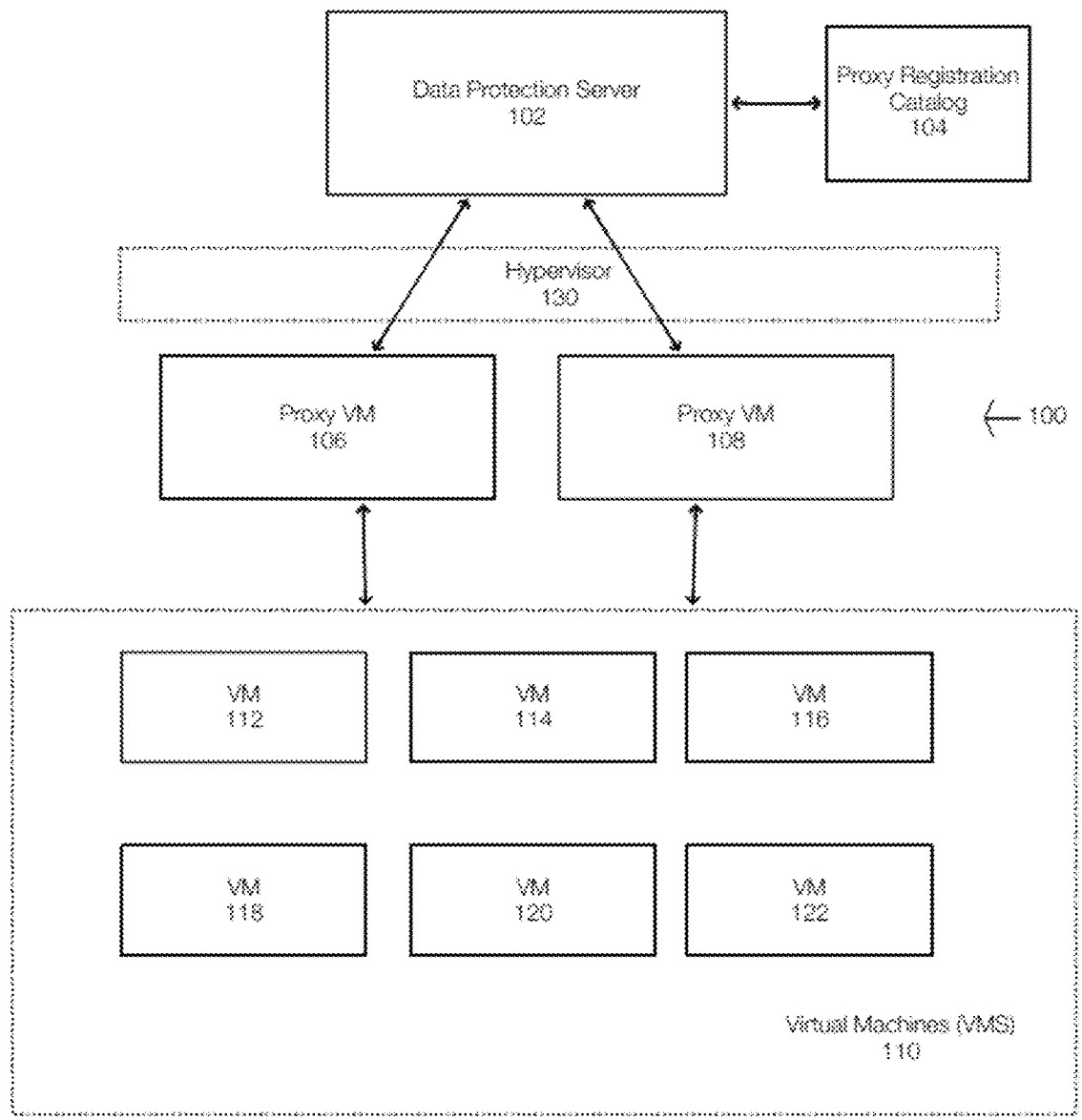
FIG. 1 illustrates an example of a computing system in which a catalog or proxy register is used when selecting which virtual machines are the subject of a data protection operation.

Embodiments of the invention relate to systems and methods for performing data protection operations including backup and/or restore operations. More specifically, embodiments of the invention relate to systems and methods for performing data protection operations such that proxies (e.g., agents or virtual machines are configured to handle or perform a backup operation or a restore operation through a hypervisor) that are registered to the data protection server are not permitted to be part of the backup/restore operation.

Conventionally, some backup applications have prevented their proxies (which may be a virtual machine (VM)) from being included in a data protection operation by changing the annotation of the proxy. When the annotation is changed, the VM becomes included in a set or group of proxies that the data protection server is not backing up. This introduces an annotation dependency into the data protection system that complicates the data protection operations and introduces risk that may prevent data protection operations from being performed properly.

Embodiments of the invention eliminate this problem and provide additional advantages. For example, a virtual machine in a computing environment can be configured to run various applications. The virtual machine can also be used or configured as a proxy that is involved in a data protection operation such as a backup operation. Embodiments of the invention provide flexibility such that the proxy or virtual machine can be protected. In addition, annotation dependency of the virtual machines as least with respect to a data protection system is removed in embodiments of the invention.

In one example, a proxy register is provided to keep track of which virtual machines or proxies are formally registered with a given data protection server. This removes the need to change the virtual machine's annotations and allows unregistered proxies or virtual machines to be part of the data protection operations performed by that data protection server or system In some examples, annotations are tags that are set to the virtual machine by a data protection application or data protection server. This is to make sure that while the VM backup/restore operations are being performed, the VM is identified as being associated with that data protection application or server. Thus, if the application wants to perform any other operation using the same VM or perform the same operation again, the operation will not be allowed. Annotations also help the data protection application understand that VM is a Proxy VM. Based on the annotation, the data protection application can ignore the proxy VM when the VMs to be protected are selected. Annotations can also include information like when was the last time VM was protected.

To eliminate annotation dependency, a proxy register is used. The proxy register, in one example, is a database catalog (or other suitable structure or representation) created on the data protection server. When the proxy VM is registered to the data protection server or with the data protection applications, a unique ID is generated for the proxy VM being registered. This ID and other information will be added to the catalog and will be only deleted when the proxy VM is removed from application.

With a database catalog, the data protection application/server will understand that these proxy VMS are registered and will not need to read data from the annotations associated with the VM. Thus, the annotation dependency is removed and problems associated with annotations are effectively eliminated in the context of data protection applications.

In this manner, proxy VM that are registered with the data protection application or data protection server will be ignored during the data protection operations. All other proxies can be protected by the data protection application or the data protection server.

Embodiments of the invention ensure that ensure that a proxy VM that is not registered with a current data protection server can be protected (e.g., backed up, restored, etc.). Because a proxy or proxy VM is performing a data protection operation (when a command is accepted from a data protection application or data protection server), the proxy VM will not be protecting itself or any other proxy or proxy VM that is participating the data protection operation.

As previously mentioned, a proxy VM may be like any other VM. For example, a user may be interested in adding more applications or software to the proxy VM and using the proxy VM like any other VM. Embodiments of the invention ensure that if the proxy VM is not being used for data protection operations, it can be protected like any other VM.

In another example, a proxy or proxy VM may be registered with a data protection application or a data protection server. If this proxy VM is cloned, the cloned proxy becomes a normal VM (and has a unique ID) and is not registered with the data protection application or with the data protection server. As a result, the cloned VM can be protected by the data protection server or by the data protection application.

In one embodiment, proxy VMs that register with a data protection server (or application) will not be allowed to be included in any restore/backup operations performed by that specific protection server or application. Proxies that are not registered with that specific protection server or application can participate in the data protection operations. In other words, registered proxies are not protected (e.g., backed up) while unregistered proxies can be protected. As a result, unregistered proxies can be protected by a data protection server or application using a registered proxy. These unregistered proxies may or may not be registered to with another data protection server or data protection application.

FIG. 1 illustrates an example of a computing system 100 that is configured to perform various operations including data protection operations. The system 100 includes a data protection server 102 that may have a data protection application executing thereon. Reference to the data protection server 102 may also be construed as reference to the data protection application. As described in more detail, the system 100 may include multiple data protection servers.

The system 100 may also include virtual machines 110 (and/or physical machines). The virtual machines (VMs) 110 include VMs 112, 114, 116, 118, 120 and 122 in this example. However, the number of VMs in the system 100 is, of course, not limited to any particular number. Virtual machines can be added, removed, cloned, or the like in the system 100.

In this example, the proxy VMs 106 and 108 may be included in the virtual machines 110. In this example, however, the virtual machines 106 and 108 may also server as proxies. A proxy VM, by way of example and not limitation, is or may include an agent that is handling a data protection operation (e.g., backup, restore, deduplication, copy, etc.) through a hypervisor 130. However, the proxy VMs 106 and 108 may also be running other applications and may be included in a data protection operation.

During a data protection operation or when creating a data protection policy, one or more of the virtual machines 110 may be identified and selected for protection. For example, the data protection server 102 may be configured to perform data protection operations for a subset of the virtual machines 110. In one example, the data protection server 102 may be configured to provide data protection operations for VMs 112, 114, and 120.

In this example, the catalog 104 includes an entry for the proxy VM 106 and does not include an entry for the proxy VM 108. When configuring a data protection operation, a VM selection console may be used to identify the VMs to be protected. By accessing and using the catalog 104, proxy VMs that are registered with the data protection server 102 in the catalog 104 can be disabled or prevented from being part of the data protection operation (at least because they will be performing the data protection operation). Any VM (including proxy VM) that is not registered in the catalog 104 can be included in the data protection operations performed by the data protection server 102.

By registering VMs or proxy VMs with the data protection server 102 in the catalog 104, no annotations are needed because the catalog 104 will act as the record for reference. Each data protection server 102 may be associated with its own proxy registration catalog. Further, if the proxy VM 106 is registered in the catalog 104 and then cloned, the clone of the proxy VM 106 will have its own unique ID that will not be included in the catalog 104. As a result, protection of the clone of the proxy VM 106 will not be blocked. Because the clone has a separate and unique ID, it can be registered separately with the data protection server 102 in the catalog 104 without relying on annotations.

In contrast, if an annotation were used as previously described instead of the catalog 104, protection of the clone of the proxy VM 106 would not be allowed because the clone would have the same annotation as the proxy VM 106. This could potentially result in yet another change to an annotation, which introduces unwanted complexity and potential problems into the ability to provide effective data protection operations.

Thus, in this example, the data protection server 102 maintains or has access to a proxy registration catalog 104. The catalog 104 simplifies the process of determining which of the virtual machines 110 (which may include proxy VMs) can be protected and which of the virtual machines 110 are excluded from data protection operations. As described in more detail below, the fact that the proxy VM 106 is registered in the catalog 104 of the data protection server 102 does not prevent the proxy VM 106 from being protected. In one example, the proxy VM 106 will be protected by a different data protection server 102 with which the proxy VM 106 is not registered.

Figure 2:
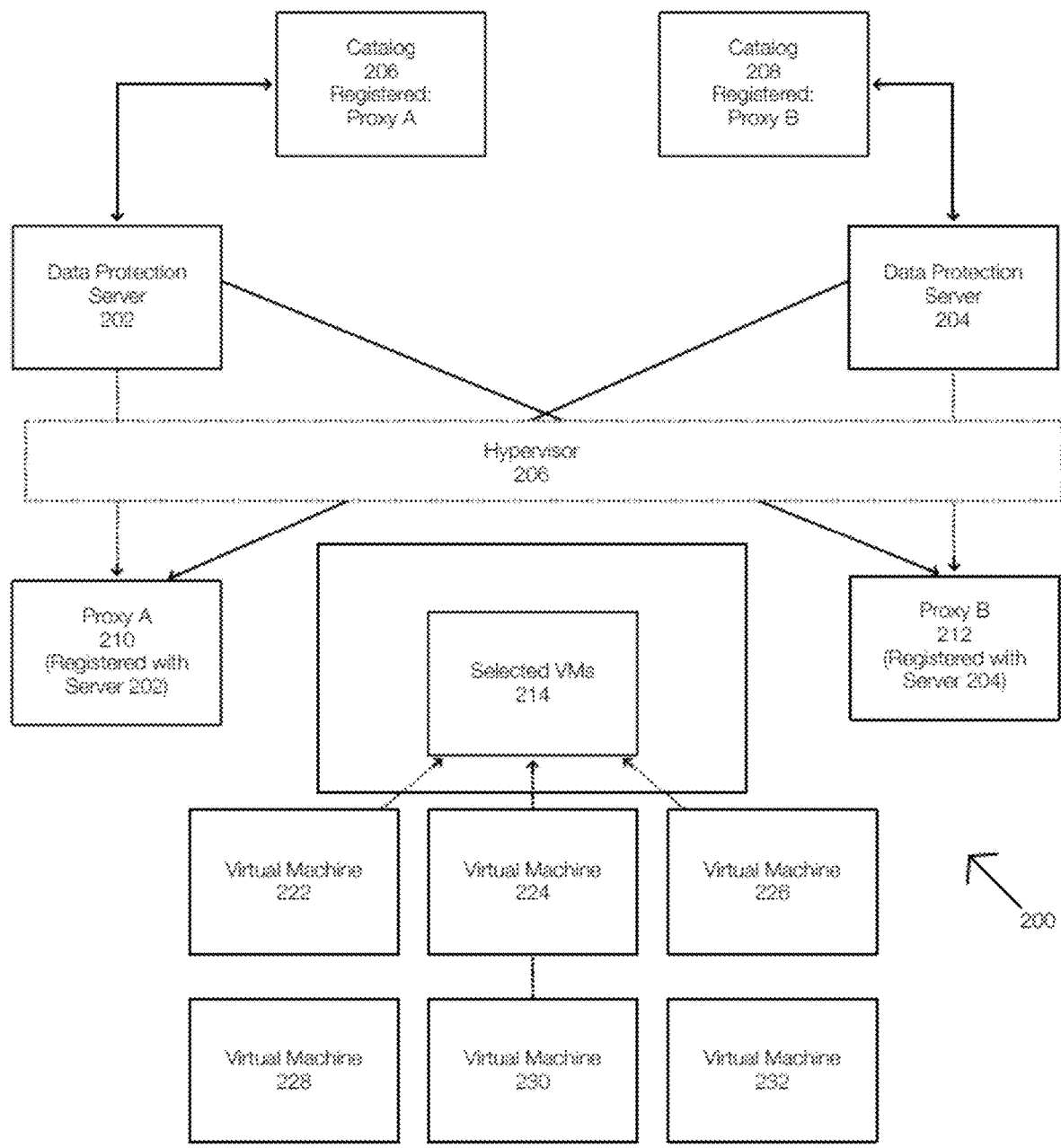
FIG. 2 illustrates another example of a computing system for performing data protection operations using a proxy registry.

FIG. 2 illustrates an example of a computing system 200. The system 200 is an expansion of the system 100 and illustrates data protection operations in the context of multiple data protection servers. FIG. 2 illustrates a data protection server 202 and a data protection server 204, which may be part of the same computing system 200.

The server 202 is associated with a catalog 206. The catalog 206 conveys that the Proxy A (proxy 210) is registered with the server 202. Similarly, the catalog 208 illustrates that the proxy B (proxy 212) is registered with the server 204.

FIG. 2 further illustrates virtual machines 222, 224, 226, 228, 230, and 232. The proxy A 210 ad the Proxy B 212 may also be part of the pool of virtual machines illustrated in FIG. 2.

When setting up a data protection operation, such as a backup operation, virtual machines are selected and included in the selected VMs 214. Assume, for example, that the selected VMs are selected for protection by the server 202. In this example, the selected VMs may include the VMs 222, 226, and 230. Because the proxy A is registered in the catalog 206, the proxy A is precluded from being selected or is ignored. Because the proxy A 210 is registered with the server 202 and will be performing the data protection operation through the hypervisor 206 in conjunction with the server 202 in one example, the proxy A 210 will not be protected by the server 202. However, the proxy A 210 can be protected by the server 204 because the proxy A 210 is not registered in the catalog 208 of the server 204.

Similarly, the proxy B 212 is registered with the data protection server 204. As a result, the proxy B 212 will not be backed up or protected by data protection operations performed by the data protection server 204 and the proxy B 212. The proxy B 212, however, can be protected (e.g., backed up) by the data protection server 202 and the proxy A 210.

In one embodiment, each virtual machine is associated with a unique identifier. When a virtual machine (or proxy) registers with a protection server, the unique identifier can be recorded and stored. Going forward, the data protection server can prevent registered virtual machines from being selected for including in a particular backup operation while allowing other virtual machines to be selected. Virtual machines or proxies that work with other data protection servers and that are not registered with the current data protection server are not disabled from being selected In other words, the catalog in which proxies are registered allow proxies operating on behalf of other data protection servers to be protected.

TABLE 1

| Hypervisor | Proxy Name | Unique ID | State | Substate |
|---|---|---|---|---|
| hype1 | abc | 1230 | Registered | Enabled |
| hype1 | xyz | 1231 | Registered | Disabled |
| hype2 | pqr | 1519 | Registered | Enabled |

Table 1 illustrates an example of a catalog (e.g., the catalog 206 or 208). This example of a catalog ensures that no annotations are needed because the catalog or proxy register acts as a record of reference on each data protection server.

If a proxy is cloned, the clone will have a unique identifier that is different from the parent proxy. As a result, the clone is not included in the catalog and data protection operations for the clone are not blocked by the catalog.

Consider, for example, the catalog or proxy register shown in Table 1 above. After taking a clone of proxy abc, abc_clone may have a unique ID 1251—the unique ID of the clone will never be the same as the parent —1230 in this example. As a result, when a selector is selecting virtual machines to include in a data protection operation, the abc_clone will not be prevented from being selected. Thus, the abc_clone can be backed up or be the subject of another data protection operation.

If abc_clone registers with the data protection server, an entry will be made in the catalog shown in Table 2. This will prevent abc_clone from being the subject of data protection operations performed by the server with which the clone is registered. The clone, however, can participate in performing the data protection operations.

With a catalog or proxy register, annotations have no role in determining which virtual machines can be the subject of data protection operations If, in a virtual environment, proxy A is registered to server X and proxy B is registered to server Y, then proxy A should be allowed to be part of the protection provided by the server Y and proxy B should be allowed to be part of or included in the protection provided by the server X.

Below is the proxy register or catalog for Server X in Table 2.

TABLE 2

| Hypervisor | Proxy Name | Unique ID | State | Substate |
|---|---|---|---|---|
| hype1 | abc | 1230 | Registered | Enabled |
| hype1 | xyz | 1231 | Registered | disabled |
| hype2 | pqr | 1519 | Registered | Enabled |
| hype1 | A | 1234 | Registered | Enabled |

The catalog or proxy register shown in Table 2 does not have an entry for proxy B at least because the proxy B is registered with the server Y. As a result, the server X is allowed to perform a backup of the proxy B. Thus, the proxy B is selectable from the perspective of data protection operations performed by the server X.

Below is the proxy register for the server Y in Table 3.

TABLE 3

| Hypervisor | Proxy Name | Unique ID | State | Substate |
|---|---|---|---|---|
| hype1 | ijk | 2100 | Registered | Enabled |
| hype1 | B | 2200 | Registered | Enabled |

Similarly, the proxy register or catalog associated with the server Y does not have an entry for the proxy A. In one example, proxies can register with more than one server or with only a single server. In this example, the proxy A is registered with the server X as previously described. Because the catalog or proxy register of the server Y does not include an entry for the proxy A, the server Y is allowed to perform data protection operations (e.g., take a backup and/or restore) the proxy A.

Figure 3:
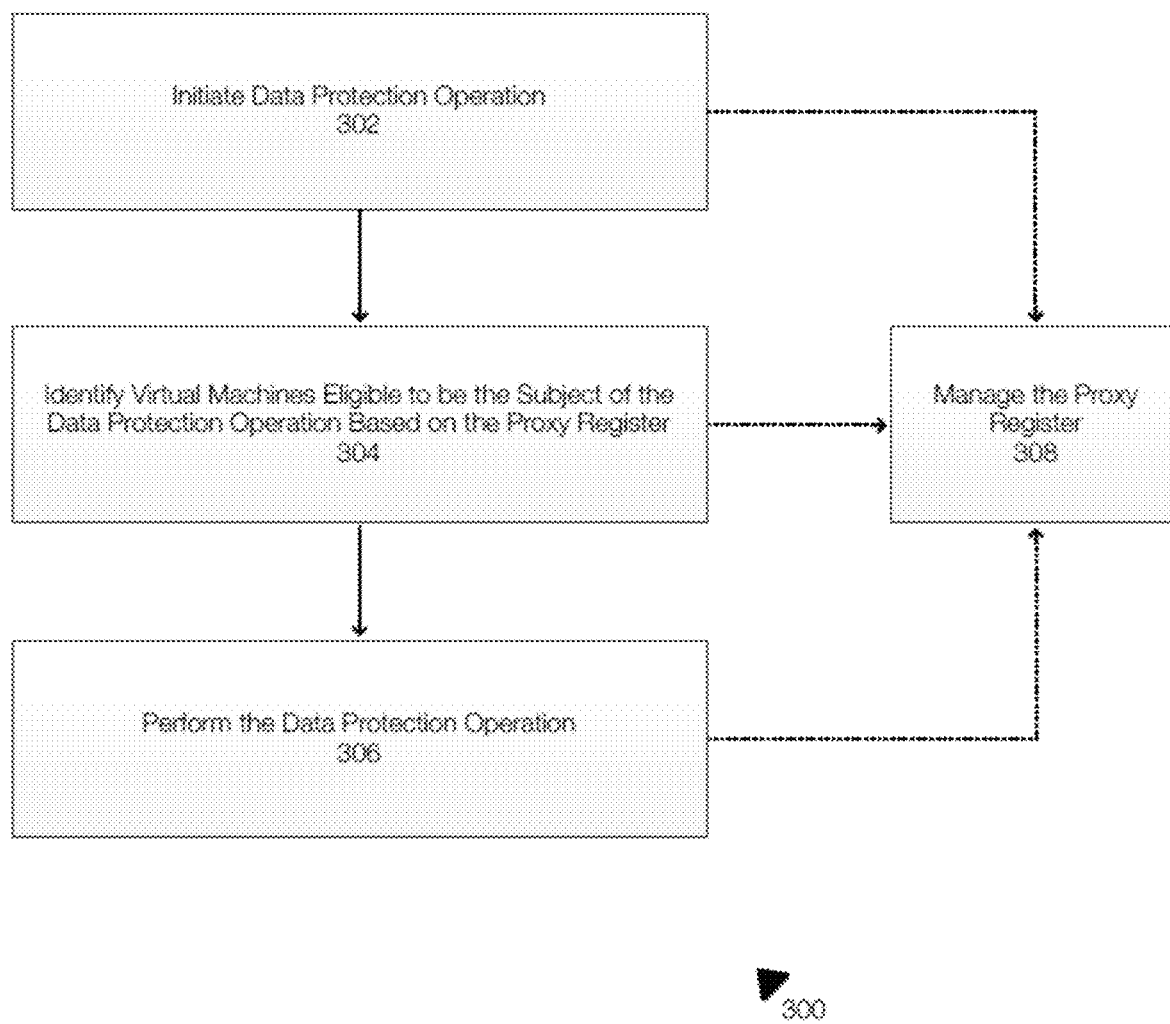
FIG. 3 is an example of a flow diagram for performing data protection operations in a computing system where some of the virtual machines may be excluded from being the subject of the data protection operations.

FIG. 3 illustrates an example of a method 300 for performing data protection operations. The method 300 often begins when a data protection operation is initiated 302. A data protection operation (e.g., backup, restore, de-duplicate, compress, encrypt, or the like or combination thereof) can be initiated automatically, by a user, periodically, or the like.

When a data protection operation is initiated, the subject of the data protection operation is then determined. For example, in a scenario where the data protection operation is intended to protect one or more virtual machines in a computing environment (e.g., nodes of a cluster in a high availability system or virtual machines in a network or the like), the virtual machines that are eligible to be the subject of the data protection operation are identified or selected 304. The selection may be automatic or manual. For example, a data protection server may be configured to perform backup operations on a predetermined group of virtual machines while another data protection server may be configured to perform backup operations on a different set or group of virtual machines. In one example, these groups may be completely separate or partially overlap.

When identifying or selecting the virtual machines to include in a data protection operation, the proxy register may be consulted at 304. All proxies that have registered with the data protection server performing the data protection operation are not allowed to be selected. If a list of available virtual machines is displayed, the registered proxies of the data protection server may not be displayed or may be greyed out or may not be selectable. This step may also allow the data protection server to identify which proxy to use in performing the data protection operation.

Once the set of virtual machines has been selected, the data protection operation is performed 306. Similarly, the proxies that are involved in performing the data protection operation may be the subject of data protection operations performed by data protection servers to whom they are not registered. This ensures that all proxies and all virtual machines can be protected by the data protection system.

In addition, the proxy register may by managed 308 at any point of the method 300, including before or after the method 300 is performed. Proxies can register with a data protection server or with multiple data protection servers. Proxies can be unregistered from data protection servers. For example, an agent may migrate in a computing system from one virtual machine to another. This may result in the deregistration of one virtual machine and the registration of a different virtual machine in the proxy register.

When virtual machines are cloned, the close receive a unique ID and are not initially registered with any data protection server. The manner in which the steps or acts are performed to select virtual machines via a user interface (e.g., a selector) can vary. However, embodiments of the invention ensure that, for a particular data protection server, the registered proxies are excluded from the protection even if they participate in providing the protection.

Further the data protection operation may generate backups, full backups, incremental backups, point in time copies, snapshots, or the like or combinations thereof.

Although embodiments of the invention are discussed in the context of virtual machines, embodiments of the invention can also be applied to virtual and/or non-virtual computing environments. Virtual machines, physical nodes, servers, applications, and the like can be the subject of data protection operations. Data protection operations can be performed in on-premise networks, local area networks, data centers, or the like or combination thereof.

It should be appreciated that the present invention can be implemented in numerous ways, including as a process, an apparatus, a system, a device, a method, or a computer readable medium such as a computer readable storage medium or a computer network wherein computer program instructions are sent over optical or electronic or magnetic communication links. Applications may take the form of software executing on a general or specific purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data protection operation, the method comprising:
   initiating a data protection operation by a data protection server, wherein the data protection server is associated with a proxy register, wherein the proxy register identifies virtual machines that perform data protection operations for the data protection server;
   excluding virtual machines included in the proxy register associated with the data protection server from being protected by the data protection operation, wherein virtual machines or proxies that are not registered with the data protection server in the proxy register are eligible to be protected by the data protection operation; and performing the data protection operation on at least some of the virtual machines that are not registered in the proxy register by one or more of the virtual machines identified in the proxy register along with the data protection server.

2. The method of claim 1, further comprising registering the virtual machines in the proxy register such that the registered virtual machines are excluded from the data protection operations of the data protection server without annotating the registered virtual machines.

3. The method of claim 1, further comprising cloning a first virtual machine that is registered with the data protection server, wherein the clone virtual machine is not automatically registered in the proxy register.

4. The method of claim 1, further comprising performing the data protection operations on virtual machines that are not identified in the proxy register.

5. The method of claim 1, further comprising cloning a first virtual machine that is registered with the data protection server, wherein the clone virtual machine is not automatically registered in the proxy register and does not include an annotation related to the data protection server.

6. The method of claim 1, wherein proxies identified in the proxy register are each associated with unique identifier in the proxy register and wherein the ability of the proxies identified in the proxy register to participate in the data protection operation or be the subject of the data protection operation is not dependent on any annotations associated with the virtual machines registered in the proxy register.

7. The method of claim 1, further comprising adding virtual machines to the proxy register and/or removing virtual machines to the proxy register.

8. The method of claim 1, further comprising selecting virtual machines to be included in the data protection operation and determining if any of the identified virtual machines are registered in the proxy register, wherein virtual machines included in the proxy register cannot be selected for the data protection operation.

9. The method of claim 8, further comprising removing virtual machines from the proxy register such that the removed virtual machines can be selected for the data protection operation.

10. The method of claim 1, wherein virtual machines included in the proxy register can be protected by a data protection operation performed by a second data protection server as long as the virtual machines in the proxy register are not also in a proxy register of the second data protection server.

11. The method of claim 1, further comprising migrating an agent from a first virtual machine to a second virtual machine, wherein migrating the agent may deregister the first virtual machine from the proxy register and register the second virtual machine in the proxy register.

12. A non-transitory computer readable medium comprising computer executable instructions configured to be executed by a processor to implement a method for performing a data protection operation, the method comprising:

initiating a data protection operation by a data protection server, wherein the data protection server is associated with a proxy register, wherein the proxy register identifies virtual machines that perform data protection operations for the data protection server;

excluding virtual machines included in the proxy register associated with the data protection server from being protected by the data protection operation, wherein virtual machines or proxies that are not registered with the data protection server in the proxy register are eligible to be protected by the data protection operation; and performing the data protection operation on at least some of the virtual machines that are not registered in the proxy register by one or more of the virtual machines identified in the proxy register along with the data protection server.

13. The non-transitory computer readable medium of claim 12, the method further comprising registering the virtual machines in the proxy register such that the registered virtual machines are excluded from the data protection operations of the data protection server without annotating the registered virtual machines.

14. The non-transitory computer readable medium of claim 12, the method further comprising cloning a first virtual machine that is registered with the data protection server, wherein the clone virtual machine is not automatically registered in the proxy register.

15. The non-transitory computer readable medium of claim 12, the method further comprising performing the data protection operations on virtual machines that are not identified in the proxy register.

16. The non-transitory computer readable medium of claim 12, the method further comprising cloning a first virtual machine that is registered with the data protection server, wherein the clone virtual machine is not automatically registered in the proxy register and does not include an annotation related to the data protection server.

17. The non-transitory computer readable medium of claim 12, wherein proxies identified in the proxy register are each associated with unique identifier in the proxy register and wherein the ability of the proxies identified in the proxy register to participate in the data protection operation or be the subject of the data protection operation is not dependent on any annotations associated with the virtual machines registered in the proxy register.

18. The non-transitory computer readable medium of claim 12, the method further comprising adding virtual machines to the proxy register and/or removing virtual machines to the proxy register, wherein virtual machines included in the proxy register can be protected by a data protection operation performed by a second data protection server as long as the virtual machines in the proxy register are not also in a proxy register of the second data protection server.

19. The non-transitory computer readable medium of claim 12, the method further comprising selecting virtual machines to be included in the data protection operation and determining if any of the identified virtual machines are registered in the proxy register, wherein virtual machines included in the proxy register cannot be selected for the data protection operation, and removing virtual machines from the proxy register such that the removed virtual machines can be selected for the data protection operation.

20. The non-transitory computer readable medium of claim 12, the method virtual machine, wherein migrating the agent may deregister the first virtual machine from the proxy register and register the second virtual machine in the proxy register.

* * * * *